(12) United States Patent
Eriksson

(10) Patent No.: US 12,104,943 B2
(45) Date of Patent: Oct. 1, 2024

(54) GUIDED WAVE RADAR LEVEL GAUGE AND METHOD FOR CONTROLLING THE GUIDED WAVE RADAR LEVEL GAUGE

(71) Applicant: Rosemount Tank Radar AB, Mölnlycke (SE)

(72) Inventor: Mikael Eriksson, Västervik (SE)

(73) Assignee: ROSEMOUNT TANK RADAR AB, Molnlycke (SE)

( * ) Notice: Subject to any disclaimer, the term of this patent is extended or adjusted under 35 U.S.C. 154(b) by 726 days.

(21) Appl. No.: 17/122,252

(22) Filed: Dec. 15, 2020

(65) Prior Publication Data
US 2021/0215527 A1      Jul. 15, 2021

(30) Foreign Application Priority Data
Jan. 13, 2020   (EP) ..................................... 20151410

(51) Int. Cl.
| G01F 23/284 | (2006.01) |
| G01S 13/10 | (2006.01) |
| G01S 13/24 | (2006.01) |
| G01S 13/88 | (2006.01) |
| H01Q 1/22 | (2006.01) |

(52) U.S. Cl.
CPC .......... *G01F 23/284* (2013.01); *G01S 13/103* (2013.01); *G01S 13/24* (2013.01); *G01S 13/88* (2013.01); *H01Q 1/225* (2013.01)

(58) Field of Classification Search
CPC ...... G01F 23/284; G01S 13/103; G01S 13/24; G01S 7/28; G01S 13/88; H01Q 1/225; H01Q 13/02
See application file for complete search history.

(56) References Cited

U.S. PATENT DOCUMENTS

| 3,695,107 A * | 10/1972 | Hertz | .................... G01F 23/284 |
| | | | 73/290 R |
| 2002/0026828 A1 | 3/2002 | Fehrenbach et al. | |
| 2005/0179584 A1 | 8/2005 | Ohlsson | |

(Continued)

FOREIGN PATENT DOCUMENTS

| EP | 2026046 A2 * | 2/2009 | .......... G01F 23/284 |
| EP | 3 029 434 | 6/2016 | |

OTHER PUBLICATIONS

Extended European Search Report from European Patent Application No. 20151410.6, dated Jul. 28, 2020.

*Primary Examiner* — Amy He
(74) *Attorney, Agent, or Firm* — Westman, Champlin & Koehler, P.A.

(57) ABSTRACT

A guided wave radar level gauge for determining a fill level of a product contained in a tank comprising: a transceiver configured to provide a transmit signal, Tx-signal, in the form of a pulse train, having a controllable pulse repetition frequency $f_{Tx}$, and to receive a reflected signal resulting from a reflection of the transmit signal at a surface of the product; a probe connected to the transceiver and configured to propagate the Tx-signal towards the surface and to return the reflected signal to the transceiver, the probe having a known length; and control circuitry configured to determine the fill level based on the received reflected signal, wherein the control circuitry is further configured to set the pulse repetition frequency based on the length of the probe.

16 Claims, 3 Drawing Sheets

(56) References Cited

U.S. PATENT DOCUMENTS

| | | | |
|---|---|---|---|
| 2015/0160067 A1* | 6/2015 | Sai | G01S 7/285 342/21 |
| 2016/0153821 A1* | 6/2016 | Nilsson | G01F 23/284 342/124 |
| 2018/0328771 A1 | 11/2018 | Edvardsson | |

* cited by examiner

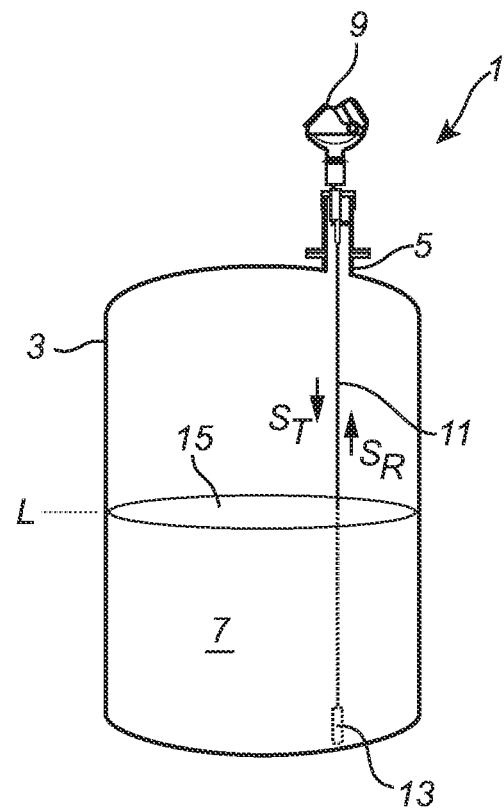
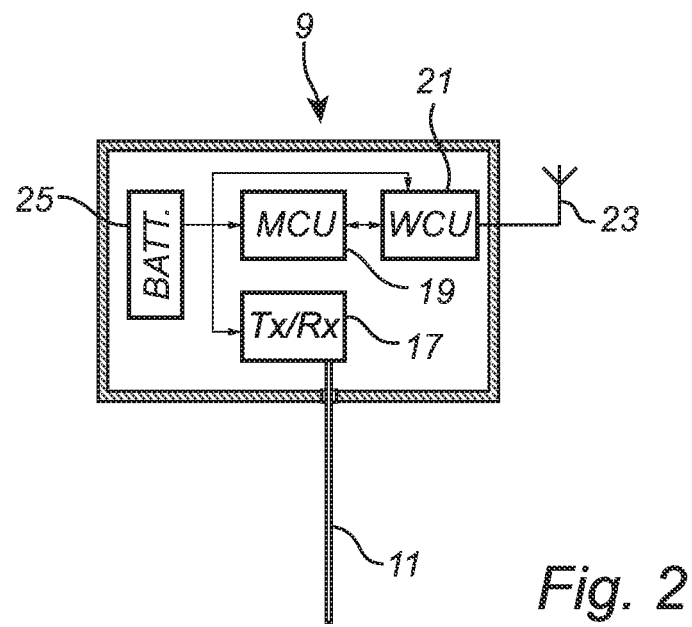
Fig. 1
Fig. 2

GUIDED WAVE RADAR LEVEL GAUGE AND METHOD FOR CONTROLLING THE GUIDED WAVE RADAR LEVEL GAUGE

CROSS-REFERENCE TO RELATED APPLICATION

This application claims priority to European Patent Application No. 20151410.6, filed on Jan. 13, 2020, the content of which is hereby incorporated by reference in its entirety.

FIELD OF THE INVENTION

The present invention relates to a guided wave radar level gauge and to a method for controlling the guided wave radar level gauge. In particular, the present invention is aimed at reducing the influence of end-of-probe reflections in a guided wave radar level gauge.

BACKGROUND OF THE INVENTION

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank.

The transmitted electromagnetic signals are reflected at the surface of the product, and the reflected signals are received by a receiver or transceiver comprised in the radar level gauge. Based on the transmitted and reflected signals, the distance to the surface of the product can be determined. More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

One category of RLG systems relate to so-called pulsed RLG systems that determine the distance to the surface of the product contained in the tank based on the difference in time (time-of-flight) between transmission of a pulse and reception of its reflection at the surface of the product.

Most pulsed radar level gauge systems employ Time Domain Reflectometry (TDR), which provides a time expansion of the (extremely short) time-of-flight. Such TDR radar level gauge systems generate a transmit pulse train having a first pulse repetition frequency Tx, and a reference pulse train having a second pulse repetition frequency Rx that differs from the transmitted pulse repetition frequency by a known frequency difference $\Delta f$. This frequency difference $\Delta f$ is typically in the range of Hz or tens of Hz.

The transmit pulse train is emitted (non-contact or probe) towards the surface of a product contained in a tank, and the reflected signal is received and sampled with the reference pulse train. At the beginning of a measurement sweep, the transmission signal and the reference signal are synchronized to have the same phase. Due to the frequency difference, the phase difference between the transmission signal and the reference signal will gradually increase during the measurement sweep. This gradually shifting time sampling of the reflected signal will provide a time expanded version of the time-of-flight of the reflected pulses, from which the distance to the surface of the product contained in the tank can be determined.

The transmit signal is typically not only reflected at the impedance transition constituted by the interface between the tank atmosphere and the surface of the product, but at several other impedance transitions encountered by the transmit signal. In particular, for a guided wave radar system, the signal is reflected at the end of the probe acting as a waveguide. Thereby, end-of-probe reflections may disturb the measurement since the end-of-probe echo may be mistaken for a surface echo.

The above issue is addressed by US2002/0026828 where a wave absorption device is arranged at the end of the probe so that an electromagnetic wave reaching the end of the probe can only be reflected to a limited degree, thereby providing an effective reduction in spurious echoes.

However, since the reflected signal is only partially absorbed by the described device, there is still a remaining reflection that may influence the level measurement in some applications and under specific circumstances.

Accordingly, for some applications it is desirable to further reduce the influence of end-of-probe reflections in a guided wave radar level gauge.

SUMMARY

In view of above-mentioned and other drawbacks of the prior art, it is an object of the present invention to provide a solution to the influence of end-of-probe reflections in a guided wave radar level gauge.

According to a first aspect of the invention, there is provided a guided wave radar level gauge for determining a fill level of a product contained in a tank comprising: a transceiver configured to provide a transmit signal, Tx-signal, in the form of a pulse train, having a pulse repetition frequency frX, and to receive a reflected signal resulting from a reflection of the transmit signal at a surface of the product; a probe connected to the transceiver and configured to propagate the Tx-signal towards the surface and to return the reflected signal to the transceiver, the probe having a known length; and control circuitry configured to determine the fill level based on the received reflected signal, wherein the control circuitry is configured to provide a pulse repetition frequency to the transceiver based on the length of the probe.

The present invention is based on the realization that the double and triple bounce from the end-of-probe reflection may not have been suppressed before the next pulse has been transmitted, depending on the probe length and the pulse repetition frequency. This has the effect that the double and triple bounce from the old pulse is measured in the next tank signal. The described type of radar level gauge system can be used in very large tanks, for example tanks used for holding liquid natural gas (LNG), where the probe may be as long as 50 m or more. This in turn has the effect that a pulse repetition frequency for TDR which may be suitable in other applications will suffer disturbances in the form of double and triple end-of-probe reflections when using a longer probe. In particular, a longer probe requires a lower pulse repetition frequency to avoid the undesirable interactions.

In the present context, the control circuitry is seen as controlling the transceiver such that the pulse repetition frequency is determined by, stored in or received by the control circuitry and subsequently provided to the transceiver where the transmit signal is formed. It would however be equally possible to provide the same functionality in systems having different architectures, such as an integrated module comprising the functionality of both the transceiver and associated control circuitry.

Accordingly, by controlling the pulse repetition frequency based on the length of the probe, the frequency can be controlled so that end of probe reflections does not interfere with the level measurement. Thereby, in addition to improving the measurement quality, the present invention has the advantage that the described radar level gauge can be used in tanks of different size since the pulse repetition frequency can be set based on the size of the tank, which is not possible in pulsed radar level gauge systems having a fixed pulse repetition frequency. In short, the described system and method makes it possible to reduce the influence of disturbing bouncing echoes in long probes by having a controllable pulse repetition frequency.

A transceiver having a controllable pulse repetition frequency may for example be achieved using PLL (phase locked loop) circuitry configured to receive an oscillator frequency as an input frequency and to provide a regulated output frequency.

According to one embodiment of the invention, the control circuitry is configured to set the pulse repetition frequency such that a travel time for a double end-of-probe reflection is lower than a period of the Tx-signal. The travel time for the double end-of-probe reflection is the time it takes for the pulse to travel from the transceiver to the end of the probe, back to the transceiver and once more to the end of the probe and back to the transceiver. It is thus a double reflection at the end of the probe. A period of the Tx-signal is simply the time between two consecutive pulses of the pulse train, i.e. the inverse of the pulse repetition frequency. The travel time is also dependent on the dielectric properties of the material surrounding the probe. However, as a first approximation the dielectric constant can be assumed to be known with sufficient accuracy to accurately determine the travel time for an end-of-probe reflection and to set the pulse repetition frequency thereafter.

According to one embodiment of the invention, the control circuitry is configured to set the pulse repetition frequency such that a travel time for a triple end-of-probe reflection is lower than a period of the Tx-signal. The travel time for a triple end-of-probe reflection is thus the time it takes for the signal to travel the length of the probe six times. In some applications it may not be sufficient to eliminate the influence of just the double end-of-probe reflection, but also the triple end-of-probe reflection has the be taken into consideration. The influence of the triple end-of-probe reflection can thus be eliminated by further reducing the pulse repetition frequency.

According to one embodiment of the invention, the control circuitry is further configured to determine a length of the probe and to set the pulse repetition frequency based on the determined length of the probe. It may for example be possible to determine the length of the probe if it is known that the tank is empty, or if both the fill level and the dielectric properties of the medium in the tank is known. However, it is also possible that the length of the probe is set manually by an operator and/or that the control circuitry uses a stored value for the length of the probe when setting the pulse repetition frequency.

According to one embodiment of the invention, the control circuitry is further configured to determine a dielectric constant of a medium surrounding the probe, and to set the pulse repetition frequency based on the determined dielectric constant. Since the propagation velocity depends on the dielectric properties of the medium surrounding the probe, the pulse repetition frequency can be set with better accuracy if the propagation velocity is known. It can for example be possible the determine the dielectric constant if both the fill level and the length of the probe is known. There may also be several different media surrounding the probe, such as the product in the tank and the tank atmosphere, in which case a known or estimated fill level of the tank can be used to estimate an effective propagation velocity.

Accordingly, the control circuitry may be configured to determine an effective length of the probe based on properties of media surrounding the probe and to set the pulse repetition frequency based on the determined effective length, and/or to determine an effective length of the probe based on a fill level of the tank, and to set the pulse repetition frequency based on the determined effective length.

According to one embodiment of the invention, the control circuitry is further configured to detect a change in fill level and to set pulse repetition frequency based on a current fill level of the tank. Since the dielectric surroundings of the probe will change with a changing fill level in the tank, the pulse repetition frequency can be set more accurately by determining the effective length of the probe with respect to the effective propagation velocity of the signal taking dielectric surroundings of the whole length of the probe into account.

According to a second aspect of the invention, there is provided a method for determining a fill level of a product contained in a tank using a guided wave radar level gauge. The method comprises: by a transceiver, forming a transmit signal, Tx-signal, in the form of a pulse train having a pulse repetition frequency $f_{Tx}$, and receiving a reflected signal resulting from a reflection of the transmit signal at a surface of the product, wherein the transmit signal propagates along a probe connected to the transceiver and configured to propagate the transmit signal towards the surface and to return the reflected signal to the transceiver; wherein forming the Tx-signal comprises setting the pulse repetition frequency based on the length of the probe; and determining the fill level based on the received reflected signal.

Effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein:

FIG. 1 schematically illustrates an exemplary tank arrangement comprising a guided wave radar level gauge system according to an embodiment of the present invention;

FIG. 2 is schematic illustration of a measurement unit comprised in the radar level gauge system in FIG. 1;

DETAILED DESCRIPTION OF EXAMPLE EMBODIMENTS

Figure 3:
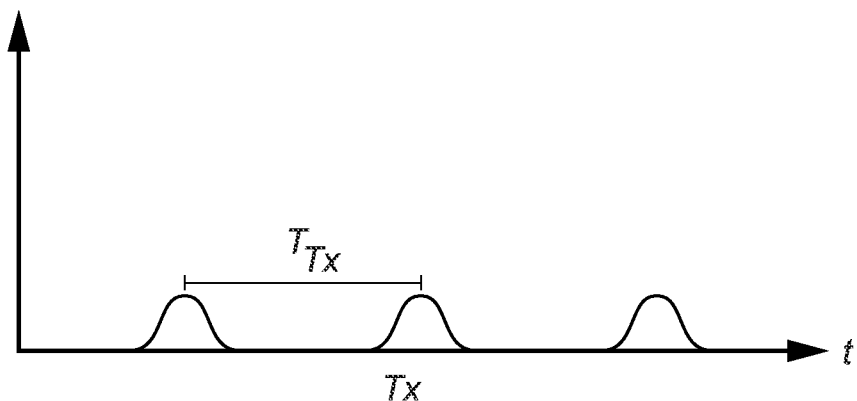
FIG. 3 is a graph schematically outlining a signal used in an embodiment of the invention.

In the present detailed description, various embodiments of the system and method according to the present invention are mainly described with reference to a guided wave radar level gauge installed in a tank located on land. However, the described system and method is suitable for use in other areas such as in marine applications. Moreover, various embodiments of the present invention are mainly discussed with reference to a pulsed radar level gauge system with a signal propagation device in the form of a probe, and wireless communication capabilities.

It should be noted that this by no means limits the scope of the present invention, which also covers a pulsed radar level gauge system with another type of signal guiding device, as well as a pulsed radar level gauge system configured for wired communication, for example using a 4-20 mA current loop and/or other wired means for communication.

FIG. 1 schematically illustrates an exemplary radar level gauge system 1 of GWR (Guided Wave Radar) type installed at a tank 3 having a tubular mounting structure 5 (often referred to as a "nozzle") extending substantially vertically from the roof of the tank 3.

The guided wave radar level gauge system 1 is installed to measure the filling level of a product 7 in the tank 3. The radar level gauge system 1 comprises a measuring unit 9 and a propagation device, here in the form of a single conductor probe 11 extending from the measuring unit 9, through the tubular mounting structure 5, towards and into the product 7 in the tank 3. In the example embodiment in FIG. 1, the single conductor probe 11 is a wire probe, that has a weight 13 attached at the end thereof to keep the wire straight and vertical. The probe 11 may also be attached to the bottom of the tank. However, the probe may equally well by any other type of probe suitable for guided wave radar applications.

By analyzing a transmitted signal $S_T$ being guided by the probe 11 towards the surface 15 of the product 7, and a reflection signal $S_R$ traveling back from the surface 15, the measurement unit 9 can determine the filling level L of the product 7 in the tank 3. It should be noted that, although a tank 3 containing a single product 7 is discussed herein, the distance to any material interface along the probe can be measured in a similar manner. The radar level gauge system in FIG. 1 will now be described in more detail with reference to the schematic block diagram in FIG. 2.

Referring to the schematic block diagram in FIG. 2, the measurement unit 9 of the exemplary radar level gauge system 1 in FIG. 1 comprises a transceiver 17, measurement control circuitry, here labeled as a measurement control unit (MCU) 19, a wireless communication control unit (WCU) 21, a communication antenna 23, and an energy store, such as a battery 25.

As is schematically illustrated in FIG. 2, the MCU 19 controls the transceiver 17 to generate, transmit and receive electromagnetic signals. The transmitted signals pass through a feed-through to the probe 11, and the received signals pass from the probe 11 through the feed-through to the transceiver 17.

The MCU 19 determines the filling level L of the product 7 in the tank 3 and provides a value indicative of the filling level to an external device, such as a control center, from the MCU 19 via the WCU 21 through the communication antenna 23. The radar level gauge system 1 may advantageously be configured according to the so-called WirelessHART communication protocol (IEC 62591).

Although the measurement unit 9 is shown to comprise an energy store (battery 25) and to comprise devices (such as the WCU 21 and the communication antenna 23) for allowing wireless communication, it should be understood that power supply and communication may be provided in a different way, such as through communication lines (for example 4-20 mA lines).

The local energy store 25 need not (only) comprise a battery, but may alternatively, or in combination, comprise a capacitor or super-capacitor.

Moreover, the measurement control unit (MCU) 19 may more generally be referred to as control circuitry 19, and the control circuitry 19 may include a microprocessor, microcontroller, programmable digital signal processor or another programmable device. The control circuitry may also, or instead, include an application specific integrated circuit, a programmable gate array or programmable array logic, a programmable logic device, or a digital signal processor. Where the control circuitry includes a programmable device such as the microprocessor, microcontroller or programmable digital signal processor mentioned above, the processor may further include computer executable code that controls operation of the programmable device.

The control circuitry 19 is further configured to set the pulse repetition frequency $f_{Tx}$ based on the length of the probe 11. The time $T_{Tx}$ between consecutive pulses in the pulse train forming the transmit signal is the inverse of the pulse repetition frequency, $T_{Tx}=1/f_{Tx}$, as illustrated in FIG. 3.

Figures 4A, 4B:
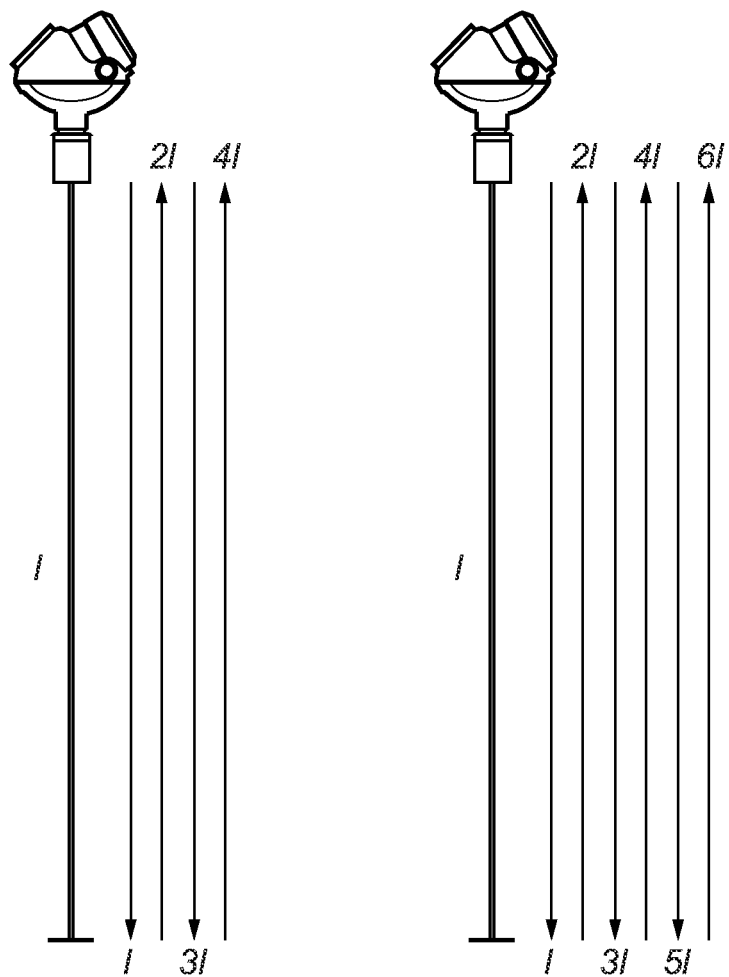
FIGS. 4A-B schematically illustrate features of a radar level gauge according to an embodiment of the invention.

A double end-of-probe reflection travels the length of the probe four times before reaching the transceiver as illustrated in FIG. 4A. Thereby, the travel time $t_{double}$ for a double end-of-probe reflection can be determined as $$t_{double} = \frac{2*2*l_{probe}*\sqrt{\varepsilon_r}}{c_0}$$

meaning that the pulse repetition frequency is set as $$f_{Tx} < \frac{c_0}{2*2*l_{probe}*\sqrt{\varepsilon_r}}$$

in order for the travel time for the double end-of-probe reflection to be lower than the period of the Tx-signal. Here, $l_{probe}$ is the length of the probe, $c_0$ is the speed of light, $\varepsilon_r$ is the relative dielectric constant of the medium in which the probe is immersed. By setting the pulse repetition frequency as described by the above relation, it can be ensured that a pulse from a double reflection reaches the transceiver before the next pulse of the pulse train is transmitted. Thereby, the double end-of-probe reflection will not disturb the measurement.

A triple end-of-probe reflection travels the length of the probe six times before reaching the transceiver as illustrated in FIG. 4B. Thereby, the travel time for a triple end-of-probe reflection, $t_{triple}$ can be determined as $$t_{triple} = \frac{2*3*l_{probe}*\sqrt{\varepsilon_r}}{c_0}$$

meaning that the pulse repetition frequency is set as $$f_{Tx} < \frac{c_0}{2*3*l_{probe}*\sqrt{\varepsilon_r}}$$

in order for the travel time for the triple end-of-probe reflection to be lower than the period of the Tx-signal.

By setting the pulse repetition frequency as described by the above relation, it can be ensured that a pulse from a triple end-of-probe reflection reaches the transceiver before the next pulse of the pulse train is transmitted. Thereby, the triple end-of-probe reflection will not disturb the measurement. The pulse repetition frequency may also be set to avoid the influence of reflections having even higher multiples, such as 4, 5, 6 etc.

The pulse repetition frequency is thus provided from the control circuitry 19 to the transceiver so that the transceiver 17 can form a signal having the specified pulse repetition frequency. The control circuitry 19 may determine the pulse repetition frequency in a number of different ways. The pulse repetition frequency may for example be stored in the control circuitry during manufacturing or installation for applications where it is known that the probe length is fixed. The pulse repetition frequency may also be provided to the control circuitry 19 by an operator, either locally at the radar level gauge 1 or remotely via a communications interface 21, 23 of the radar level gauge 1. The pulse repetition frequency may also be determined automatically by the control circuitry 19, either based on a known probe length or based on a probe length which has been determined in a measurement by the radar level gauge 1, such as in an empty tank measurement. Thereby, the transceiver 17 can form a transmit signal having a pulse repetition frequency which is based on the length of the probe.

Furthermore, the above described calculations can be adapted to take the fill level of the tank into account by determining an effective resulting propagation velocity based on the fill level and on the dielectric properties of the materials surrounding the probe both above and below the fill level.

Figure 5:
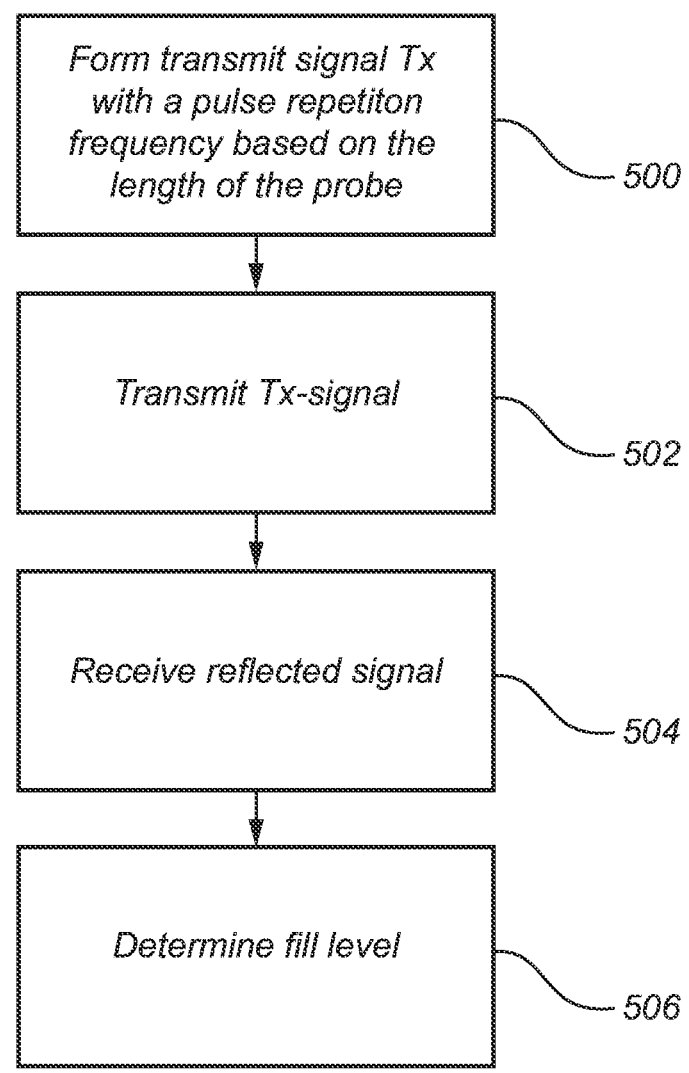
FIG. 5 is a flow chart outlining the general steps of a method according to an embodiment of the invention.

FIG. 5 is a flow chart outlining the general steps of a method for determining a fill level of a product contained in a tank using a guided wave radar level gauge according to an embodiment of the invention, and the method will be described with reference to the system describes in FIGS. 1 and 2. The method comprises, by the transceiver 17, forming 500 a transmit signal, Tx-signal, in the form of a pulse train having a pulse repetition frequency $f_{Tx}$. It is here assumed that the transceiver 17 includes all the required circuitry for forming the Tx-signal, and the transceiver 17 may further be controlled by the measurement control unit (MCU) 19 (i.e. by control circuitry) as described above.

The method further comprises transmitting 502 the transmit signal and receiving 504 a reflected signal resulting from a reflection of the transmit signal at a surface of the product, wherein the transmit signal propagates along the probe 11 connected to the transceiver 17.

According to the described method, forming the transmit signal comprises setting the pulse repetition frequency based on the length of the probe; and the method finally determines 506 the fill level based on the received reflected signal.

The length of the probe may be set manually by an operator when installing the radar level gauge so that the length of the probe is stored in a memory unit of the radar level gauge which is accessible by the control circuitry. It would also be possible to set the probe length remotely using a communication interface of the radar level gauge. Moreover, the method may further comprise automatically determining the length of the probe and setting the pulse repetition frequency based on the determined length of the probe.

Since the propagation velocity of the signal is dependent of the dielectric constant of the medium in which the probe is immersed, the desired pulse repetition frequency depends on the dielectric properties of the material in the tank and also on the fill level of the tank. Thereby, the method may comprise determining the dielectric properties of the material in the tank.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A guided wave radar level gauge for determining a fill level of a product contained in a tank comprising:
    a transceiver configured to provide a transmit signal, Tx-signal, in the form of a pulse train, having a controllable pulse repetition frequency $f_{Tx}$, and to receive a reflected signal resulting from a reflection of the transmit signal at a surface of the product;
    a probe connected to the transceiver and configured to propagate the Tx-signal towards the surface and to return the reflected signal to the transceiver, the probe having a known length; and
    control circuitry configured to determine the fill level based on the received reflected signal, wherein the control circuitry is configured to set the pulse repetition frequency such that a travel time for a double end-of-probe reflection is lower than a period of the Tx-signal.

2. The guided wave radar level gauge according to claim 1, wherein the pulse repetition frequency is set as $$f_{Tx} < \frac{c_0}{2*2*l_{probe}*\sqrt{\varepsilon_r}}$$

where $l_{probe}$ is the length of the probe, $c_0$ is the speed of light, and $\varepsilon_r$ is the relative dielectric constant of the medium in which the probe is immersed.

3. The guided wave radar level gauge according to claim 1, wherein the control circuitry is configured to set the pulse repetition frequency such that a travel time for a triple end-of-probe reflection is lower than a period of the Tx-signal.

4. The guided wave radar level gauge according to claim 3, wherein the pulse repetition frequency is set as $$f_{Tx} < \frac{c_0}{2*3*l_{probe}*\sqrt{\varepsilon_r}}$$

where $l_{probe}$ is the length of the probe, $c_0$ is the speed of light, and $\varepsilon_r$ is the relative dielectric constant of the medium in which the probe is immersed.

5. A guided wave radar level gauge according to claim 1, wherein the control circuitry is further configured to determine a length of the probe and to set the pulse repetition frequency based on the determined length of the probe.

6. The guided wave radar level gauge according to claim 1, wherein the control circuitry is further configured to determine a dielectric constant of a medium surrounding the probe, and to set the pulse repetition frequency based on the determined dielectric constant.

7. The guided wave radar level gauge according to claim 1, wherein the control circuitry is configured to determine an effective length of the probe based on properties of media surrounding the probe and to set the pulse repetition frequency based on the determined effective length.

8. The guided wave radar level gauge according to claim 1, wherein the control circuitry is configured to determine an effective length of the probe based on a fill level of the tank, and to set the pulse repetition frequency based on the determined effective length.

9. The guided wave radar level gauge according to claim 1, wherein the control circuitry is further configured to detect a change in fill level and to set the pulse repetition frequency based on a current fill level of the tank.

10. Method for determining a fill level of a product contained in a tank using a guided wave radar level gauge, the method comprising:
by a transceiver, forming a transmit signal, Tx-signal, in the form of a pulse train having a pulse repetition frequency $f_{Tx}$, transmitting the transmit signal and receiving a reflected signal resulting from a reflection of the transmit signal at a surface of the product, wherein the transmit signal propagates along a probe connected to the transceiver and configured to propagate the transmit signal towards the surface and to return the reflected signal to the transceiver;
wherein forming the transmit signal comprises setting the pulse repetition frequency such that a travel time for a double end-of-probe reflection is lower than a period of the Tx-signal; and
determining the fill level based on the received reflected signal.

11. The method according to claim 10, further comprising setting the pulse repetition frequency such that a travel time for a triple end-of-probe reflection is lower than a period of the Tx-signal.

12. The method according to claim 10, further comprising:
determining a length of the probe; and
setting the pulse repetition frequency based on the determined length of the probe.

13. The method according to claim 10, further comprising:
determining an effective length of the probe based on properties of the media surrounding the probe; and
setting the pulse repetition frequency based on the determined effective length.

14. The method according to claim 10, further comprising:
determining an effective length of the probe based on a fill level of the tank; and
setting the pulse repetition frequency based on the determined effective length.

15. The method according to claim 10, further comprising:
detecting a change in fill level of the tank; and
setting the pulse repetition frequency based on a current fill level of the tank.

16. A guided wave radar level gauge for determining a fill level of a product contained in a tank comprising:
a transceiver configured to provide a transmit signal, Tx-signal, in the form of a pulse train, having a controllable pulse repetition frequency fTx, and to receive a reflected signal resulting from a reflection of the transmit signal at a surface of the product;
a probe connected to the transceiver and configured to propagate the Tx-signal towards the surface and to return the reflected signal to the transceiver, the probe having a known length; and
control circuitry configured to determine the fill level based on the received reflected signal, wherein the control circuitry is further configured to provide a pulse repetition frequency to the transceiver based on the length of the probe so that end of probe reflections do not interfere with the level measurement.

* * * * *